United States Patent
Visser et al.

(10) Patent No.: US 12,190,081 B1
(45) Date of Patent: Jan. 7, 2025

(54) LEARNING SESSION-SPECIFIC CODE RECOMMENDATIONS FOR EDITING CODE FILES

(71) Applicant: Amazon Technologies, Inc., Seattle, WA (US)

(72) Inventors: Willem Conradie Visser, Los Gatos, CA (US); Sengamedu Hanumantha Rao Srinivasan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 71 days.

(21) Appl. No.: 17/933,461

(22) Filed: Sep. 19, 2022

(51) Int. Cl.
| | | |
|---|---|---|
| *G06F 8/41* | (2018.01) | |
| *G06F 8/33* | (2018.01) | |
| *G06N 20/00* | (2019.01) | |
| *G06F 8/36* | (2018.01) | |
| *G06F 8/38* | (2018.01) | |
| *G06F 8/70* | (2018.01) | |
| *G06F 8/72* | (2018.01) | |
| *G06F 8/73* | (2018.01) | |

(52) U.S. Cl.
CPC .............. *G06F 8/33* (2013.01); *G06N 20/00* (2019.01); *G06F 8/36* (2013.01); *G06F 8/38* (2013.01); *G06F 8/41* (2013.01); *G06F 8/42* (2013.01); *G06F 8/443* (2013.01); *G06F 8/447* (2013.01); *G06F 8/70* (2013.01); *G06F 8/72* (2013.01); *G06F 8/73* (2013.01)

(58) Field of Classification Search
CPC ..... G06F 8/33; G06F 8/30; G06F 8/42; G06F 8/36; G06F 8/443; G06F 8/447; G06F 8/70; G06F 8/41; G06F 8/72; G06F 8/38; G06F 8/73; G06N 20/00
See application file for complete search history.

(56) References Cited

U.S. PATENT DOCUMENTS

| | | | |
|---|---|---|---|
| 9,280,322 B2 | 3/2016 | Reyes Lozano et al. | |
| 9,928,040 B2 | 3/2018 | Tarlow et al. | |
| 2021/0034335 A1* | 2/2021 | Svyatkovskiy | G06F 8/33 |
| 2022/0244952 A1* | 8/2022 | Breslav | G06F 8/33 |
| 2022/0358286 A1* | 11/2022 | Wilson-Thomas | G06F 3/0482 |
| 2023/0281005 A1* | 9/2023 | Groenewegen | G06F 11/3688 |
| | | | 717/120 |
| 2023/0315400 A1* | 10/2023 | Tabachnyk | G06F 8/33 |
| | | | 717/109 |

OTHER PUBLICATIONS

Junwei Wu et al., Code recommendation for android development: how does it work and what can be improved?, Jul. 28, 2017, [Retrieved on Aug. 23, 2024]. Retrieved from the internet: <URL: https://link.springer.com/article/10.1007/s11432-017-9058-0> 14 pp. 1-14 (Year: 2017).*

(Continued)

*Primary Examiner* — Anibal Rivera
(74) *Attorney, Agent, or Firm* — Scott Foster; Kowert, Hood, Munyon, Rankin & Goetzel, P.C.

(57) ABSTRACT

Session-specific edit recommendations may be made for editing a code file. After a code editing session is started, code file edits may be captured. A machine learning technique may be applied to learn the code edits and recommend alternative code portions for portions of the code file during the code editing session. The recommendations may be provided and accepted, or not, via an interface of a code editor application.

20 Claims, 8 Drawing Sheets

(56) References Cited

OTHER PUBLICATIONS

U.S. Appl. No. 17/847,112, filed Jun. 22, 2022, Sathish Arumugam Selvaraj.
U.S. Appl. No. 17/847,113, filed Jun. 22, 2022, Praphruetpong Athiwaratkun.
U.S. Appl. No. 17/847,115, filed Jun. 22, 2022, Praphruetpong Athiwaratkun.
U.S. Appl. No. 17/847,118, filed Jun. 22, 2022, Zijian Wang.

* cited by examiner

```
┌─────────────────────────────────────────────────────────────┐
│  Identify, by a code editor application during an editing   │
│  session, portion(s) of a code file to replace with         │
│  respective alternative code portions                       │
│                          610                                │
│                                                             │
│    ┌─────────────────────────────────────────────────┐     │
│    │  Apply a machine learning technique associated  │     │
│    │           with the editing session that:        │     │
│    │                                                 │     │
│    │   ┌─────────────────────────────────────────┐  │     │
│    │   │ Recognizes the portion(s) according to  │  │     │
│    │   │  previous edits made to the code file   │  │     │
│    │   │         during the editing session      │  │     │
│    │   │                  622                    │  │     │
│    │   └─────────────────────────────────────────┘  │     │
│    │                                                 │     │
│    │   ┌─────────────────────────────────────────┐  │     │
│    │   │ Determines corresponding ones of the    │  │     │
│    │   │  previous edits as the respective       │  │     │
│    │   │        alternative code portions        │  │     │
│    │   │                  624                    │  │     │
│    │   └─────────────────────────────────────────┘  │     │
│    │                                                 │     │
│    │                       620                       │     │
│    └─────────────────────────────────────────────────┘     │
└─────────────────────────────────────────────────────────────┘
                               │
                               ▼
┌─────────────────────────────────────────────────────────────┐
│  Provide, via an interface of the code editor application,  │
│  the respective alternative code portions as                │
│  recommendations to replace the portion(s) of the code file │
│                          630                                │
└─────────────────────────────────────────────────────────────┘
```

FIG. 6

LEARNING SESSION-SPECIFIC CODE RECOMMENDATIONS FOR EDITING CODE FILES

BACKGROUND

Programming languages offer developers, designers, and other users with the ability to precisely specify the operation of various hardware or software designs for many different applications. Given the wide variety of programming languages, these developers, designers, and other users may utilize or encounter code written by another developer. Code development tools offer developers, designers, and other users with different capabilities to improve code performance and identify errors, which may in the exemplary scenario described above, help to overcome a developer's lack of familiarity with a programming language (or an environment in which the programming language is deployed) so that high performing code may still be written.

BRIEF DESCRIPTION OF THE DRAWINGS

FIG. 6 is a high-level flowchart illustrating techniques and methods to implement learning session-specific code recommendations for editing code files, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for session-specific code recommendations for editing code files are described herein. Given the proliferation of various different code sharing or distribution for adaption and use by developers in different contexts for various different purposes, developers are often faced with the challenge of editing code files which they did not write (or portions of which they did not write) in order to adapt, use, or advance an application. While some development tools have been implemented that aid developers in search for and correcting various errors, bugs, and security issues, these techniques are not specific to the editing of a particular code file to, for example, adapt it for a different purpose. Session-specific code recommendations may thus provide code editing recommendations that are specific to a code editing session. As a different code file could be edited in different ways, a session specific code recommendation technique can provide relevant edit recommendations specific to a particular adaption or edit of a code file, that would not necessarily be made to the same code file being edited for a different purpose.

Figure 1:
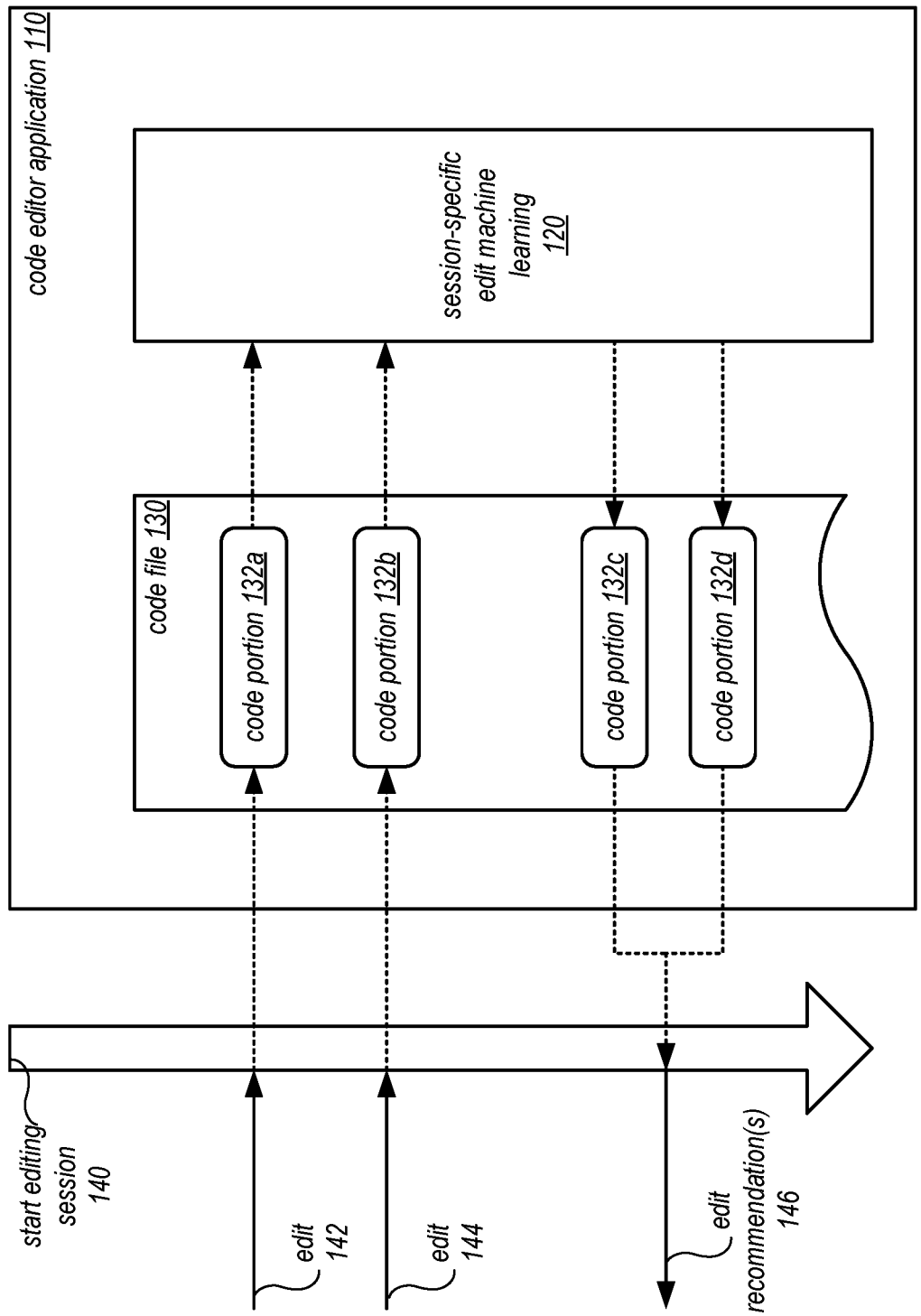
FIG. 1 is a logical block diagram illustrating session-specific code recommendations for editing code files, according to some embodiments.

FIG. 1 is a logical block diagram illustrating session-specific code recommendations for editing code files, according to some embodiments. Code editor application 110 may be a stand-alone code editing application or implemented as part of a code development service, such as code development service 210 in FIG. 2. Code editor application 110 may be integrated as part of an integrated development environment that may also offer other features, such as a compiler, test, and other development resources in addition to code editing, or may be implemented without such features. A code editor may also be implemented as part of a code notebook that supports literate programming or other styles of programming.

An editing session may be started as indicated at the top of the time line arrow for the editing session 140. Throughout editing session, different edits, such as edits 142 and 144 may be made to different portions of a code file 130, such as code portions 132a and 132b. Session-specific edit machine learning 120 may be implemented to capture the edits and learn to recognize and provide alternative code portions that will make the same (or similar edits to those provided at 142 and 144). For example, edit recommendation(s) 146 may identify code portions 132c and 132d for replacement with alternative code portions identified by session specific edit machine learning 120, which as discussed below with regard to FIGS. 3-4 and 6-7, can capture, learn, recognize and generate alternative code portions for 132c and 132d.

Please note that previous descriptions are not intended to be limiting, but are merely provided as an example of an integrated development environment, code suggestion generation system, and tools for code suggestion development. Various other embodiments may also implement these techniques, as discussed in detail below.

The specification next includes a general description of a provider network, which may implement a code development service that provides session-specific code recommendations for editing code files. Then various examples of a code development service are discussed, including different components/modules, or arrangements of components/module that may be employed as part of implementing a code development service in the provider network. A number of different methods and techniques for session-specific code recommendations for editing code files are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
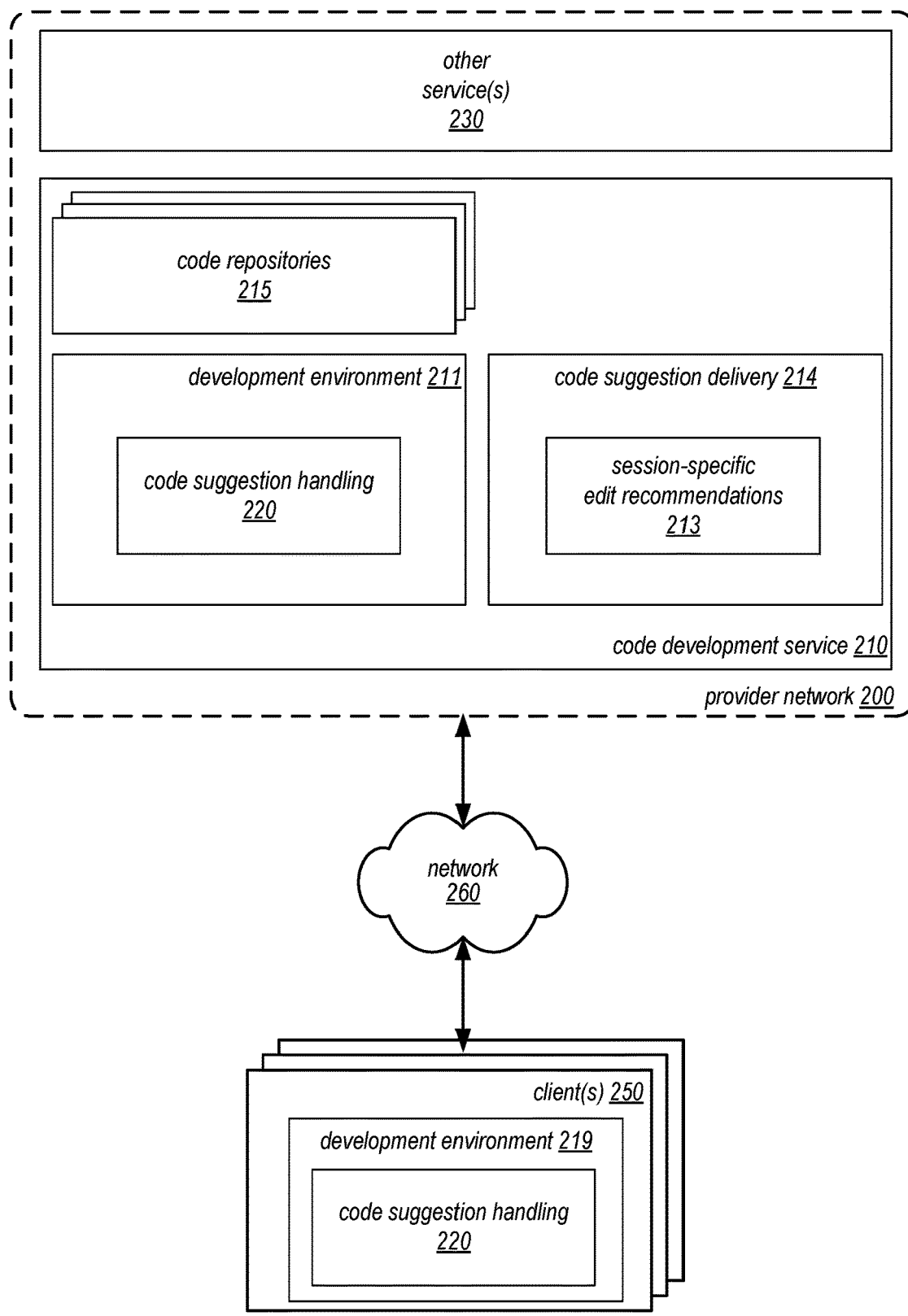
FIG. 2 is a logical block diagram illustrating a provider network that implements different services including a code development service, according to some embodiments.

FIG. 2 is a logical block diagram illustrating a provider network that implements different services including a code development service, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 210 may implement various computing resources or services, such as code development service 210, and other service(s) 230 which may be any other type of network based services, including various other types of storage (e.g., database service or an object storage service), compute, data processing, machine learning, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of code development service 210) may be implemented by a particular node or may be distributed across several nodes. In some embodiments, a given node may implement the functionality of more than one service system component (e.g., more than one data store component).

Code development service 210 may be implemented by provider network 200, in some embodiments. Code development service 210 may implement various features for writing code for different systems, applications, or devices, providing features to recommend, identify, review, build, and deploy code. For example, code development service 210 may implement development environment 211. Code development environment 211 may offer various code entry tools (e.g., text, diagram/graphics based application development) to specify, invoke, or otherwise write (or cause to be written) code for different hardware or software applications.

Code development service 210 may implement code suggestion delivery 214 which may implement various computing resources to host and implement session-specific edit recommendations 213 in a scalable fashion to delivery on-demand code suggestions across large numbers of clients using high-powered machine learning models for high-quality code suggestion results. For example, code suggestion delivery 214 may implement workload balancing and request management features to handle and return code suggestions in a timely manner to provide real-time code suggestions with little or no apparent latency to code suggestion handling 220 (within or without provider network 200).

To avoid making development environments wait on multiple code suggestions to be sent in one communication, in some embodiments, code suggestion delivery 214 may implement pagination features for code suggestions to allow multiple code suggestions to be delivered from hosts or other computing resources implementing session-specific edit recommendations 213 to recipient development environments 219 and 211 over multiple communications over time. In this way, code suggestions that are valid may be made and presented, and then updated as more are received. Such techniques offer a simulated streaming experience, without actually requiring bi-directional streaming to be supported at development environments. In this way, the benefits of fast delivery and update of code suggestions can be provided without introducing additional requirements onto development environments, which may not necessarily be maintained by the provider network 200 operator.

In various embodiments, session-specific edit recommendations 213 may generate code suggestions based on text input in development environment 211 or 219 (e.g., utilizing a plug-in or other connection which may provide real-time analysis and suggestion of code as the code is entered into the development environment 211 or 219).

Code development service 210 may implement (or have access to) code repositories 215. Code repositories 215 may store various code files, objects, or other code that may be interacted with by various other features of code development service 210 (e.g., development environment 211 to write, build, compile, and/or test code). Code repositories 215 may implement various version and/or other access controls to track and/or maintain consistent versions of collections of code for various development projects, in some embodiments. In some embodiments, code repositories may be stored or implemented external to provider network 200 (e.g., hosted in private networks or other locations).

Code development service 210 may implement an interface to access and/or utilize various features of code development service 210. Such an interface may include various types of interfaces, such as a command line interface, graphical user interface, and/or programmatic interface (e.g., Application Programming Interfaces (APIs)) in order to perform requested operations, including operations of development environment 211. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 may encompass any type of client configurable to submit network-based requests to provider network 200 via network 260, including requests for services (e.g., a request for code search or suggestion, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with code development service 210. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Figure 3:
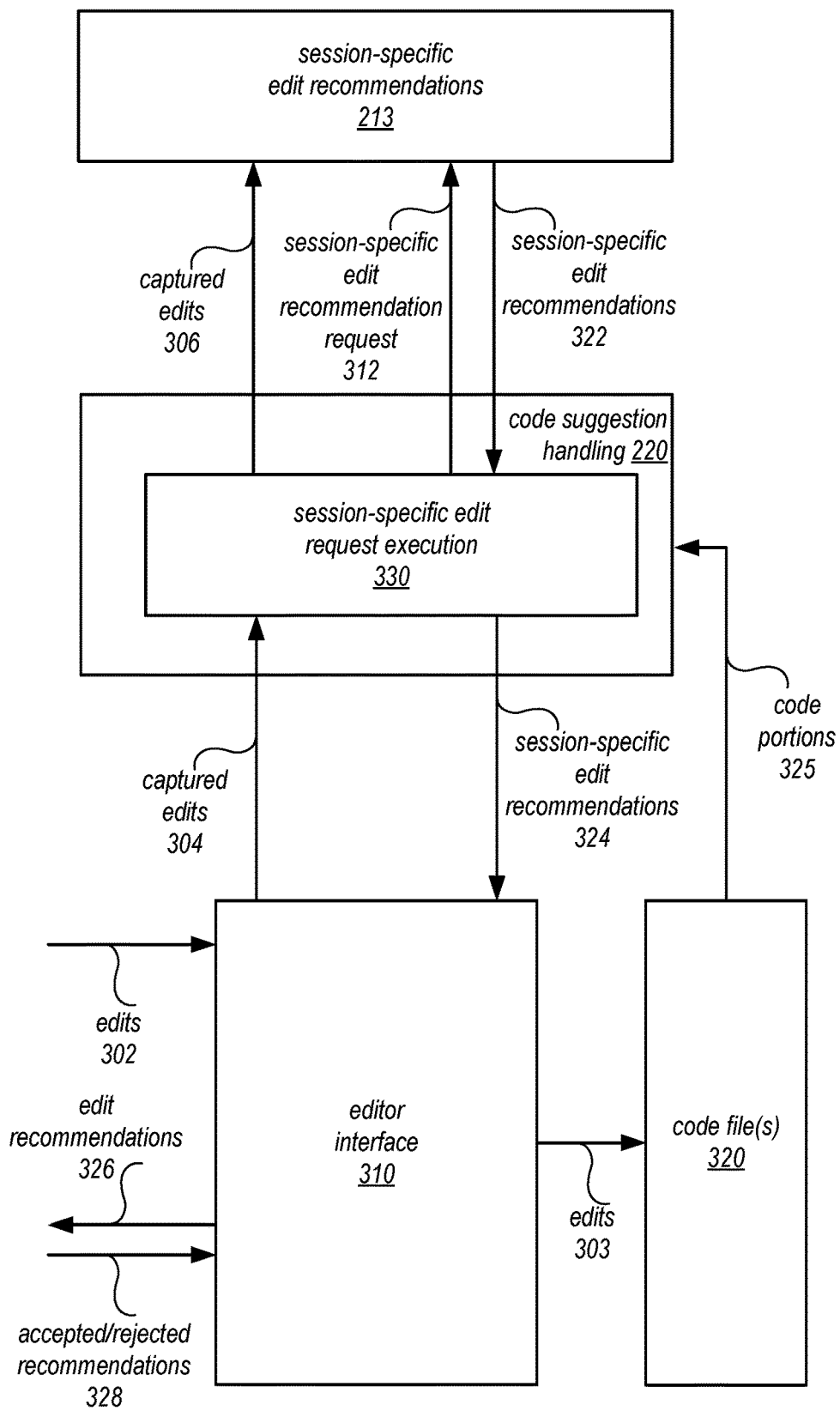
FIG. 3 is a logical block diagram illustrating code suggestion handling, according to some embodiments.

FIG. 3 is a logical block diagram illustrating code suggestion handling, according to some embodiments. Editor interface 310 may be implemented as part of an integrated development environment, like development environments 211 or 219 in FIG. 2. Editor interface 310 may receive edits to code file(s) 302, make the corresponding edits 303, and provide the captured edits 304 to session-specific edit request execution 330. Session-specific edit request execution 330 may determine when to request edit recommendations and interface with session-specific edit recommendations 213. For example, the captured edits may be provided as indicated 306 and used to learn new edits to recommend, as discussed in detail below. Session-specific edit request execution 330 may also send requests 312 for session-specific edit recommendations. These requests may be made according to various different events (e.g., requests from a user via editor interface 310, not illustrated, or in accordance with various time thresholds), and may include some or all portions 325 from code files 320.

As discussed below, session-specific edit recommendations may provide edit recommendations 322. Session-specific edit request execution 330 may provide the edit recommendations 324 back through editor interface 310, as indicated at 326. The recommended edits may then be accepted 328 and applied, as indicated at 303 or rejected 328, and not applied.

Figure 4:
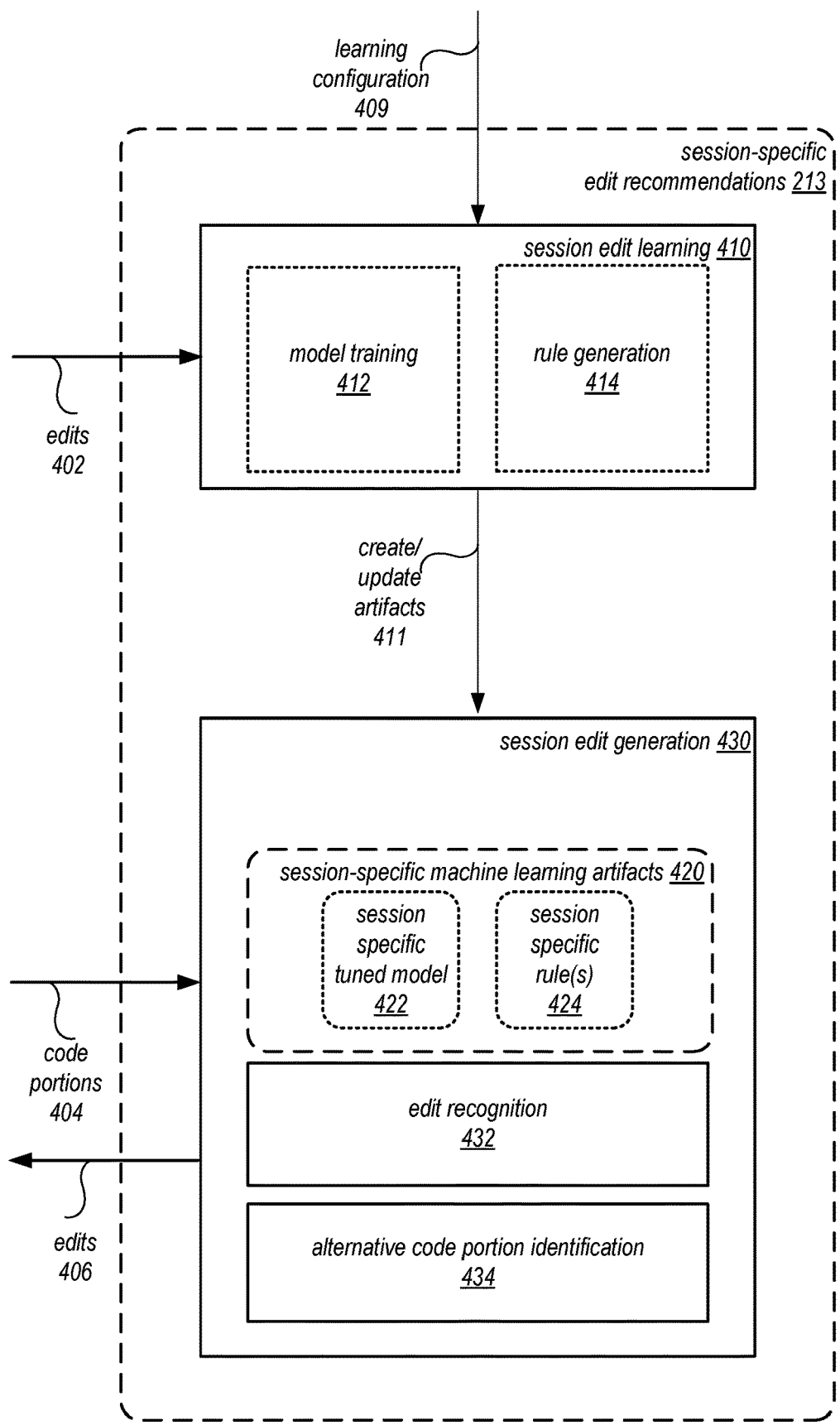
FIG. 4 is a logical block diagram illustrating session-specific edit recommendations, according to some embodiments.

FIG. 4 is a logical block diagram illustrating session-specific edit recommendations, according to some embodiments. Session-specific edit recommendations 213 may implement session edit learning 410. Session edit learning 410 may implement one (or more) machine learning techniques to handled captured edits 402. For example, session edit learning 410 may implement various techniques discussed below with regard to FIG. 7, such as waiting to capture enough edits before creating or updating artifacts 411. In some embodiments, session edit learning 410 may be configured according to learning configuration 409, which may be a request received through an interface (e.g., of a development environment to enable or otherwise configure the learning of edit recommendations for a session).

In some embodiments, session edit learning 410 may implement model training 412, which may perform various machine learning techniques that train a machine learning model (e.g., a neural network-based machine learning model) using a training data set may include captured edits 402. Various training techniques may be implemented and performed using various hyperparameters to produce session-specific tuned model 422. For example, a pre-trained text or code recommendation model may be tuned, using the captured edits as additional training data, to produce session specific tuned model 422. The updated model may then be stored, as indicated at 411 as part of session-specific machine learning artifacts 420. In some embodiments, different edits may be captured and all included in the same training run as part of model training 412, creating a batch update for multiple edit recommendations that may be made.

Session edit learning 410 may implement rule generation 414 in some embodiments. Rule generation 410 may use techniques to generate rules that recognize another code portion similar to (or the same as) an edit code portion and then provide the instructions to generate the alternative portion that corresponds to that previous edit. For example, rule generation 424 may utilize regular expressions as a technique to represent a code portion pre-edit and then use that representation for recognizing other code portions to which the edit may also be applicable. Rule generation 414 may also create a portion of the rule which instructs the alternative code portion generation (e.g., use a saved copy of the original edit, such as a saved set of characters), or the instructions on how to modify code (e.g., increment a variable value). This rule may then be stored, as indicated at 411 as part of session specific rule(s) 424 as a session specific machine learning artifact 420.

Session edit generation 430 may handle requests or events that call for the recognition 432 of code portions for which an edit 406 should be recommended and identifying 434 the alternative code portion to provide as the code portion for replacement. Session-specific machine learning artifacts 420 may be used by different machine learning techniques to implement these features. For example, session specific tuned model 422 may be applied by taking received code portion 404, generating an input format of the code portion (e.g., tokenizing the code portion, creating an input feature vector, etc.) apply the model 422 weights to produce an inference that predicts an edit (including what the alternative code portion should be). In some embodiments, a soft-max or other selection based on confidence scores for different possible edits may be used to select the one edit to recommend (e.g., the edit with the highest confidence score).

In some embodiments, session-specific rule(s) 424 may be applied to search given code portions 404 (e.g., by applying a regular expression). When a matching code portion is found, then the instructions from the corresponding rule 424 may be applied to generate and return the alternative code portion as part of an edit 406. Note that in some embodiments, combinations of different machine learning techniques, such as session specific rule(s) 424 and as session specific tuned model 422 may be used to generate code edits 406.

Figure 5:
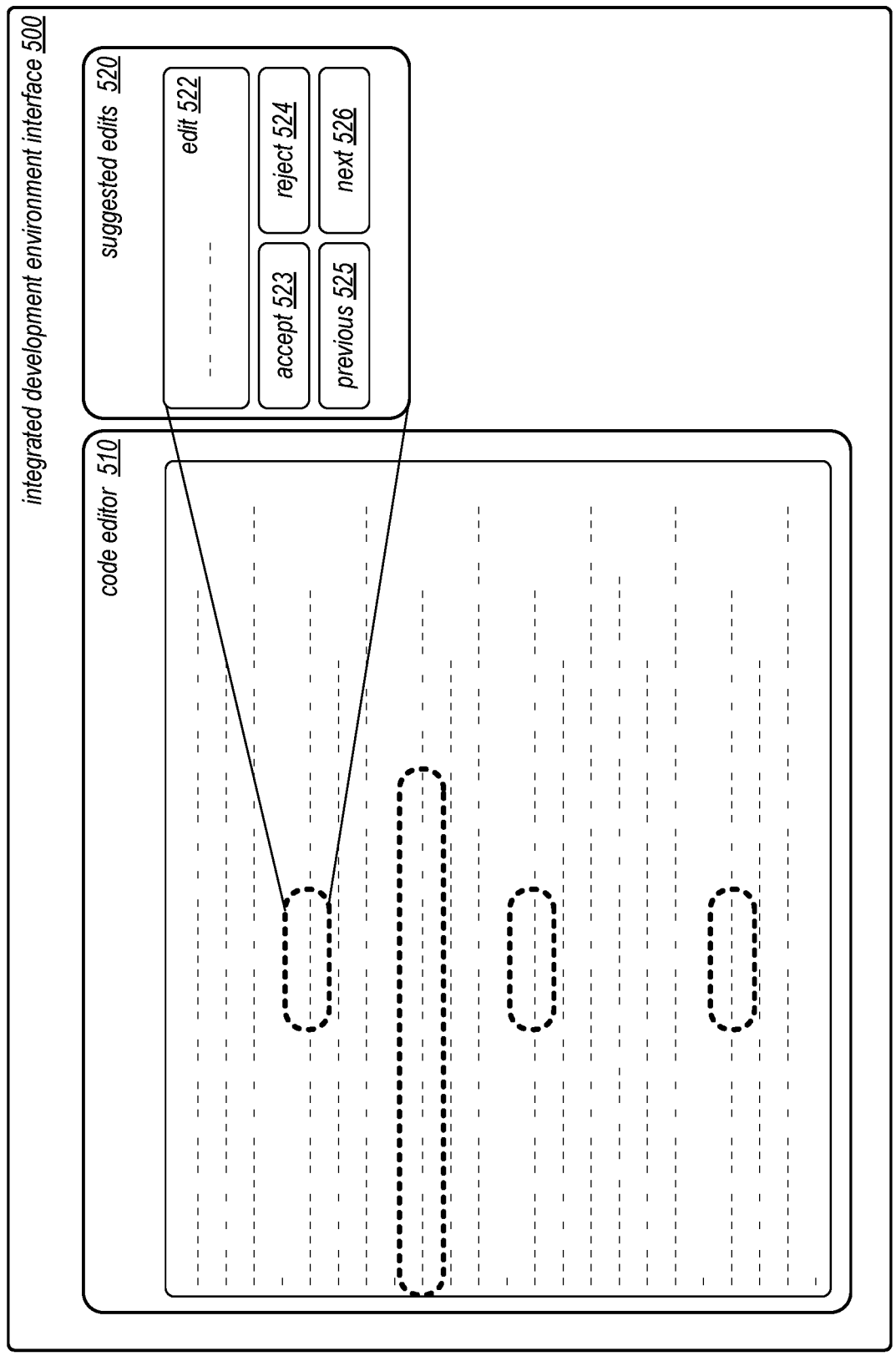
FIG. 5 is a logical block diagram illustrating an example interface of a development environment, according to some embodiments.

FIG. 5 is a logical block diagram illustrating an example interface of a development environment, according to some embodiments. Integrated development environment interface 500 may be implemented on a client of the code development service 210, as depicted in FIG. 2, or hosted as part of the code development service 210, as depicted in FIG. 2. Other embodiments that are unrelated to a code development service, such as a stand-alone code editor or integrated development environment may also implement similar interfaces to those discussed below. Integrated development environment interface 500 may implement a code editor 510 (e.g., a text editor) which may allow a user to enter code in a programming language. The session-specific edit recommendations feature 213 of code development service 210 may analyze code of an opened code file in code editor 510 (which may trigger the start of an editing session as closing the file may indicate the end of an editing session).

As depicted in the illustrated example, different code portions may be highlighted (e.g., as indicated by the circled portions). A suggested edits user interface element 520 may be provided to navigate and/or provide the recommended edits. For example, the alternative code portion 522 may be displayed. User interface elements to accept 523 or reject the edit 524 may be provided. Selection of the accept element 523 may cause the replacement to be performed. Selection of the reject element 524 may remove the edit recommendation and cause an update to session-specific edit recommendations feature 213 to not make the same recommended edit later in the session. In some embodiments, rejection of a recommendation may be implicitly determined without selection of reject element 524. For example, in such embodiments, reject element 524 may not be provided, as the rejection can be determined according to the lack of acceptance. Previous element 525 and next element 526 may be selected to navigate between edit recommendations (e.g., between the highlighted portions). In this way, some edits may be ignored and later revisited (or not).

In some embodiments, other user interface elements may be implemented which are not illustrated in FIG. 5. For example, an element selectable to save an edit for use in another editing session may be implemented. In another example, an element selectable to cause the edit recommendation to be performed on other files, packages, or other code may be selected. Another element for the session-specific edit recommendation 213 feature to be disabled for the editing session may be provided. The above examples, as well as various user interface elements to configure or control the performance of session-specific edit recommendations may be implemented in different embodiments.

The examples of learning session-specific code recommendations for editing code files discussed above with regard to FIGS. 2-5 have been given in regard to one example of a code development service. Various other types of code editor or development tools, systems, or applications may implement these techniques. FIG. 6 is a high-level flowchart illustrating techniques and methods to implement learning session-specific code recommendations for editing code files, according to some embodiments. These techniques, as well as the techniques discussed below with regard to FIG. 7, may be implemented using various components of a provider network as described above with regard to FIGS. 2-5 or other types or systems implementing code editing tools or other applications.

As indicated at 610, portion(s) of a code file may be identified to replace with respective alternative code portions during a code editing session, in some embodiments. For example, a setting, configuration, or other parameter may be used to enable automatic capture (e.g., according to the techniques discussed below with regard to FIG. 7) and recommendation of edits to provide alternative code portions to a user during the editing session. This setting, configuration, or other parameter may be specified for the code file specifically (or for a project or other collection of multiple code files). In some embodiments, this setting, configuration, or other parameter may be specified when starting a new editing session of a file. The setting, configuration, or other parameter enabling automatic capture and recommendation of edits may cause the analysis to be performed responsive to events detected by the code editor application (e.g., at time intervals or when a new edit is learned). In some embodiments, session specific edit recommendations may be specifically requested (e.g., via a user interface element of an editor or via a command of a command line interface). Such requests may be another event that causes the performance of the identification of portion(s) of the code file to replace with alternative code portions. In some embodiments, an editing session may begin when a code file (or set of code files) is opened, obtained, accessed, checked out, otherwise made ready for perform edits via a code editor or other development tool. An editing session may end when the code file (or set of code files) is closed, saved, checked-in, returned, or otherwise made unavailable for editing (until a new code session is started).

As indicated at 620, a machine learning technique associated with the editing session may be applied, in some embodiments. Different types of machine learning techniques may be applied, as discussed in detail above with regard to FIG. 4 and below with regard to FIG. 7. For example, rule-generation techniques that can recognize a pattern through captured edits and create a rule to recognize where another edit that fits the pattern could be made. In another example embodiment, deep learning techniques that utilize neural network models can be trained using captured edits to recognize where another edit that fits the pattern could be made given input code. Common to the various types of machine learning techniques that may be implemented are the applicability of the machine learning technique to recognize the portion(s) of the code filed according to previous edits made to the code file during the editing session, as indicated at 622, and determine corresponding ones of the previous edits as the respective alternative code portions 624, in some embodiments.

As indicated at 630, the respective alternative code portions may be provided via an interface of the code editor application, as recommendations to replace the portions of the code file, in some embodiments. For example, the alternative code portions may be different characters, strings, or other alternative values that may replace current code portions. The alternative code portions may include some part of the replaced portion with modifications of some kind made to the replaced portion (e.g., the addition, deletion, or a combination of both addition and deletion of characters). For instance, the alternative may append characters to a feature of the code portion (e.g., "foo" may be replaced with "foo_1" appending the "_1"). The alternative may remove characters from a feature of the code portion (e.g., "long-function-name" may be shortened to "function-name"). The alternative may both add and remove characters (e.g., "item A=1" may be replaced with "value A=2").

As discussed above, various different types of interfaces may be used, including command line and graphical displays. The provided alternative code portions may be accepted or rejected, in some embodiments (e.g., via element selection as discussed above with regard to FIG. 5). In some embodiments, a recommendation may be ignored (e.g., neither accepted and thus applied, but not rejected). In some embodiments, a distinction for handling ignored edits versus rejected edits may be made to update the machine learning technique that produced the recommended (e.g., rejected edits may not be made again whereas an ignored edit may be made again after, for instance, a period of time elapses in the editing session).

In some embodiments, a request to save or preserve the edit for later sessions or for other code files, code packages, or other code may be received, which may allow the edits to be pre-loaded or otherwise made during another editing session, even if the edits used to learn the edit recommendation are not made in that other editing session (or to be applied without explicitly opening those files in a code editing session). Although session-specific edits may be recommended in various embodiments, as discussed above, these session-specific edits may be recommended as part of a larger set of other types of edits which may be made using other machine learning or analysis techniques (e.g., included with bug fixes generated from a bug-fix model or edits that conform to a project, organization or other entity-related set of style or other programming guidelines). These other edits, however, may not be session-specific and thus may be identified differently, in some embodiments.

Figure 7:
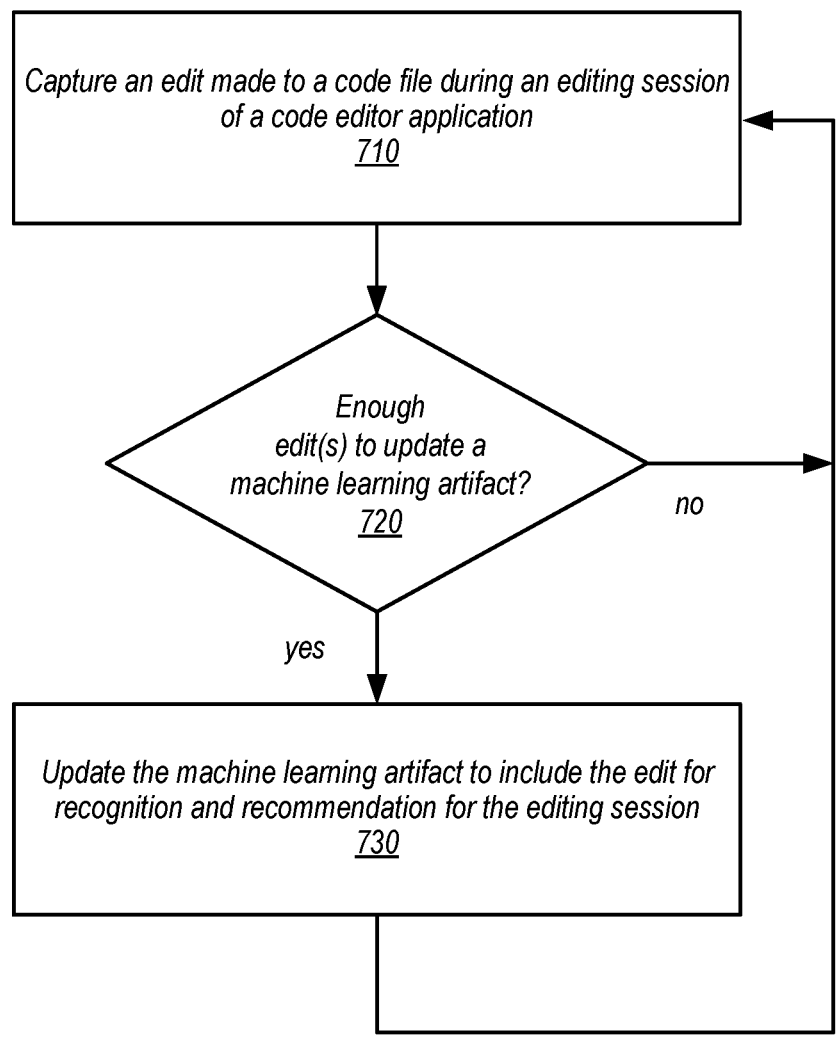
FIG. 7 is a high-level flowchart illustrating techniques and methods to implement capturing edits to update machine learning artifacts for session-specific edit recommendations, according to some embodiments.

Different types of machine learning techniques may be implemented, in some embodiments. These different techniques may provide different ways (and sensitivities or performance of capturing and generating recommended edits). Therefore one (or more) of these techniques may be implemented as part of a code editor application, in some embodiments. FIG. 7 is a high-level flowchart illustrating techniques and methods to implement capturing edits to update machine learning artifacts for session-specific edit recommendations, according to some embodiments.

As indicated at 710, an edit made to a code file during an editing session of a code editor application may be captured, in some embodiments. For example, keystroke capture, change history, or various other edit tracking techniques may be applied to record an edit made to a code file. For example, both the code portion before the edit and the code portion after the edit may be recorded. How edits are captured may vary according to the type of machine learning technique applied. For a deep learning technique that, for example, uses these edits to tune pre-trained machine learning model, the before and after edit code portions may be recorded. For another technique, such as rule technique that learns a new rule to add to a rule set for the editing session, a representation may be generated for the pre-edit code portion, such as regular expression, which can be stored along with the post-edit code portion.

A determination may be made as to whether enough edits have been captured to update a machine learning artifact, in some embodiments, as indicated at 720. For example, different types of edits may have different capture thresholds, in some embodiments. A variable or function name change may, for instance, need be only captured once to recommend making the same edit to other instances of that name in the code file. Other changes, such as changes to the input parameters of a function, for instance, may be recommended with higher confidence if capture more than once (e.g., above some threshold number of times). In some embodiments, different machine learning techniques may be determinative of (or at least partially determinative of) the number of same edits captured in order to be enough to edit a machine learning artifact. For example, deep learning techniques may have higher capture thresholds in order to tune a pre-trained model, whereas a rule generation technique can update a learned rule set on the basis of a single instance of a captured edit.

As indicated at 730, the machine learning artifact may be updated to include the edit for recognition and recommendation for the editing session, in some embodiments. Different machine learning artifacts may be used by different machine learning techniques. For example, a training data set and neural network-based model may be used for a deep learning technique, and thus the training data set and the neural network-based model may be updated. The captured edit(s) may be added to the training data set (or used to create a training data set). The training data set to execute one or more training programs to tune a pre-trained text or code recommendation model to include the captured edits, producing an updated neural network-based model, which can then be used to generate the recommendations.

In another example, a machine learning artifact may be a rule set which may be updated by adding a new rule (or modifying an existing rule) according to the captured edits. Rule generation techniques may include generating recognition criteria (e.g., regular expressions) that can be used to search a code file and then edit generation (e.g., by copying or adapting an edit according to captured edits).

As indicated by the loop back arrows, edit capture and machine learning artifact updates may be a continuous process that a code editor application performs while an editing session continues (or the edit recommendation feature is disabled, such as by a request to disable edit recommendations).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 8:
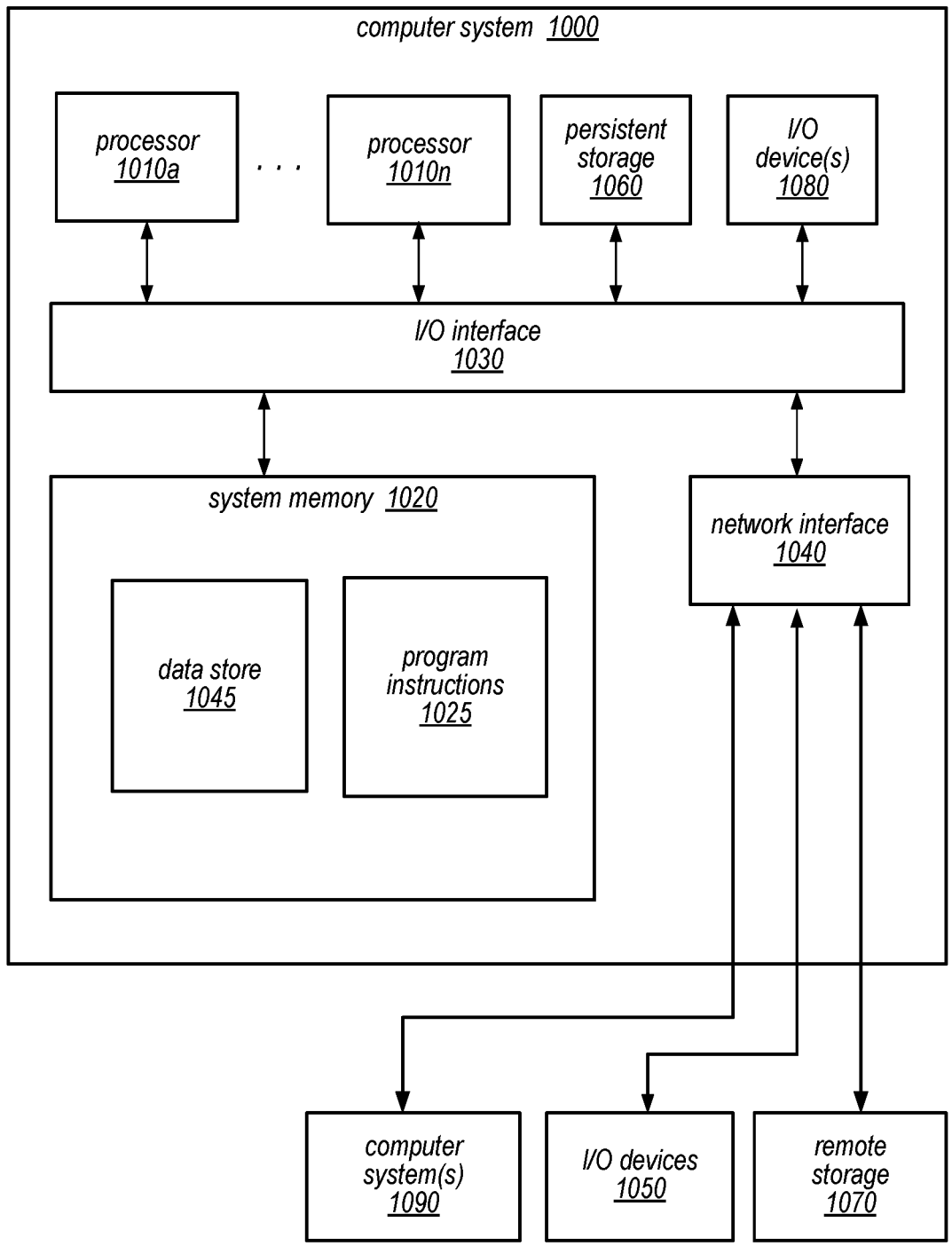
FIG. 8 is a block diagram illustrating an example computing system, according to some embodiments.

The techniques discussed above for session-specific code recommendations for editing code files may be executed on one or more computer systems, which may interact with various other devices. FIG. 8 is a block diagram illustrating an example computer system, according to various embodiments. For example, computer system 1000 may be configured to implement various systems, services or application, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques for session-specific code recommendations for editing code files described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments, such as various techniques for discovering matching code sources according to index and comparative similarity. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT. GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
at least one processor; and
a memory, storing program instructions that when executed by the at least one processor, cause the at least one processor to implement an integrated development environment, the integrated development environment configured to:
capture one or more edits to a code file received via an interface of the integrated development environment during an editing session;
update an artifact used by a machine learning technique to include the captured one or more edits;
after the update to the artifact:
apply, during the editing session, the machine learning technique to identify one or more portions of the code file to replace with respective alternative code portions that makes a same edit as one of the captured one or more edits to the code file, wherein the application of the machine learning technique:
recognizes the one or more portions of the code file according to the captured one or more edits; and
determines corresponding ones of the captured one or more edits as providing the respective alternative code portions; and
display, via the interface, the respective alternative code portions as recommendations to replace the one or more portions of the code file.

2. The system of claim 1, wherein the integrated development environment is further configured to determine that the one or more edits to the code file are enough to update the machine learning artifact before performance of the update to the machine learning artifact.

3. The system of claim 1, wherein to update an artifact used by the machine learning technique, the integrated development environment is configured to cause a pre-trained neural network-based model to be tuned to include the one or more edits.

4. The system of claim 1, wherein the integrated development environment is implemented as part of a code development service offered by a provider network.

5. A method, comprising:
identifying, by a code editor application during an editing session, one or more portions of a code file to replace with respective alternative code portions, wherein the identifying comprises:
applying a machine learning technique associated with the editing session that:
recognizes the one or more portions of the code file according to one or more previous edits made to the code file during the editing session; and
determines corresponding ones of the one or more previous edits as the respective alternative code portions, wherein the respective alternative code portions makes a same edit as one of the one or more previous edits to the code file; and
providing, via an interface of the code editor application, the respective alternative code portions as recommendations to replace the one or more portions of the code file.

6. The method of claim 5, further comprising:
capturing, by the code editor application, the one or more previous edits during the editing session;
determining, by the code editor application, that the one or more previous edits are enough to update a machine learning artifact; and
causing, by the code editor application, the machine learning artifact to be updated to include the one or more previous edits for recognition and recommendation during the editing session.

7. The method of claim 6, wherein causing the machine learning artifact to be updated to include the one or more previous edits comprises causing a pre-trained neural network-based model to be tuned to include the one or more previous edits.

8. The method of claim 6, wherein causing the machine learning artifact to be updated to include the one or more previous edits comprises generating a rule to be included in a session-specific rule set that is usable to recognize other code portions for which the one or more previous edits are applicable and generate a replacement code portion.

9. The method of claim 6, wherein an edit threshold to determine that the one or more previous edits is enough is a one edit threshold.

10. The method of claim 5, performing the identifying and the providing in response to receiving a request to make code edit recommendations received via the interface.

11. The method of claim 5, further comprising excluding from future edit recommendations one of the recommendations according to a determination by the code editor application that the recommendation is rejected.

12. The method of claim 5, further comprising replacing, by the code editor application the one or more portions of the code file with the respective alternative portions responsive to receiving an acceptance of the recommendations via the interface.

13. The method of claim 5, further comprising saving, by the code editor application, the one or more previous edits for use in providing edit recommendations in a different editing session in response to a request received via the interface.

14. One or more non-transitory, computer-readable storage media, storing program instructions that when executed on or across one or more computing devices cause the one or more computing devices to implement:
identifying, by a code editor application during an editing session, one or more portions of a code file to replace with respective alternative code portions, wherein, in identifying the one or more portions of the code file, the program instructions cause the one or more computing devices to implement:
applying a machine learning technique associated with the editing session that:
recognizes the one or more portions of the code file according to one or more previous edits made to the code file during the editing session; and
determines corresponding ones of the one or more previous edits as the respective alternative code portions, wherein the respective alternative code portions makes a same edit as one of the one or more previous edits to the code file; and
displaying, via an interface of the code editor application, the respective alternative code portions as recommendations to replace the one or more portions of the code file.

15. The one or more non-transitory, computer-readable storage media of claim 14, storing further program instructions that when executed by the at least one processor, cause the at least one processor to implement:

capturing the one or more previous edits during the editing session;

determining that the one or more previous edits are enough to update a machine learning artifact; and causing the machine learning artifact to be updated to include the one or more previous edits for recognition and recommendation during the editing session.

16. The one or more non-transitory, computer-readable storage media of claim 15, wherein, in causing the machine learning artifact to be updated to include the one or more previous edits, the program instructions cause the one or more computing devices to implement generating a rule to be included in a session-specific rule set that is usable to recognize other code portions for which the one or more previous edits are applicable and generate a replacement code portion.

17. The one or more non-transitory, computer-readable storage media of claim 14, storing further program instructions that when executed by the at least one processor, cause the at least one processor to implement excluding from future edit recommendations one of the recommendations according to a determination by the code editor application that the recommendation is rejected.

18. The one or more non-transitory, computer-readable storage media of claim 14, storing further program instructions that when executed by the at least one processor, cause the at least one processor to implement performing the identifying and the displaying after receiving a request to enable automatic code edit recommendations.

19. The one or more non-transitory, computer-readable storage media of claim 14, storing further program instructions that when executed by the at least one processor, cause the at least one processor to implement replacing, by the code editor application the one or more portions of the code file with the respective alternative portions responsive to receiving an acceptance of the recommendations via the interface.

20. The one or more non-transitory, computer-readable storage media of claim 14, wherein the code editor application is implemented as part of an integrated development environment.

* * * * *